United States Patent
Kobayashi et al.

(10) Patent No.: US 11,783,129 B2
(45) Date of Patent: Oct. 10, 2023

(54) INTERACTIVE CONTROL SYSTEM, INTERACTIVE CONTROL METHOD, AND COMPUTER PROGRAM PRODUCT

(71) Applicant: KABUSHIKI KAISHA TOSHIBA, Minato-ku (JP)

(72) Inventors: Yuka Kobayashi, Seto (JP); Hiroshi Fujimura, Yokohama (JP); Kenji Iwata, Machida (JP); Takami Yoshida, Kamakura (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 419 days.

(21) Appl. No.: 16/798,711

(22) Filed: Feb. 24, 2020

(65) Prior Publication Data
US 2020/0293717 A1  Sep. 17, 2020

(30) Foreign Application Priority Data
Mar. 13, 2019 (JP) ................................. 2019-046452

(51) Int. Cl.
*G06F 40/289* (2020.01)
*G06F 40/58* (2020.01)
(Continued)

(52) U.S. Cl.
CPC ............ *G06F 40/289* (2020.01); *G06F 40/30* (2020.01); *G06F 40/58* (2020.01); *G06N 20/00* (2019.01)

(58) Field of Classification Search
CPC ........ G06F 40/289; G06F 40/30; G06F 40/58; G06F 40/279; G06F 40/284;
(Continued)

(56) References Cited

U.S. PATENT DOCUMENTS 11,210,462 B1 * 12/2021 Sircar ................. G06F 16/9035
2010/0064030 A1 * 3/2010 Miura .................... G06F 3/0237
709/219
2020/0143792 A1  5/2020 Iwata et al.

FOREIGN PATENT DOCUMENTS

CN      101681229 A     3/2010
JP      2002-288155 A  10/2002
(Continued)

OTHER PUBLICATIONS

Ishiwatari, S. et al., "Learning to Describe Unknown Phrases with Local and Global Contexts," Proceeding of NAACL-HLT 2019, arXiv:1811.00266v2 [cs.CL] Apr. 10, 2019, 10 pages.

*Primary Examiner* — Thierry L Pham
(74) *Attorney, Agent, or Firm* — Oblon, McClelland, Maier & Neustadt, L.L.P.

(57) ABSTRACT

An interactive control system according to an embodiment includes one or more hardware processors configured to function as a detection unit, a conversion unit, first and second estimation units, and an attribute determination unit. The detection unit detects an input keyword from input information. The conversion unit converts the input information into information including the input keyword and the input-keyword-excluded context information. The first estimation unit estimates, from the context information, at least a first estimate information piece in which the input keyword's first attribute is associated with a first likelihood of the first attribute. The second estimation unit estimates, from the input keyword, at least a second estimate information piece in which the input keyword's second attribute is associated with a second likelihood of the second attribute. The attribute determination unit determines the input keyword's attribute based on the first and second estimate information.

12 Claims, 14 Drawing Sheets

(51) Int. Cl.
*G06F 40/30* (2020.01)
*G06N 20/00* (2019.01)

(58) Field of Classification Search
CPC . G06F 16/3329; G06F 16/3344; G06N 20/00;
G06N 5/02; G06K 9/6215
USPC .......................................................... 704/9
See application file for complete search history.

(56) References Cited

FOREIGN PATENT DOCUMENTS

| | | |
|---|---|---|
| JP | 2008-293302 A | 12/2008 |
| JP | 2017-21523 A | 1/2017 |
| JP | 2020-77159 A | 5/2020 |

\* cited by examiner

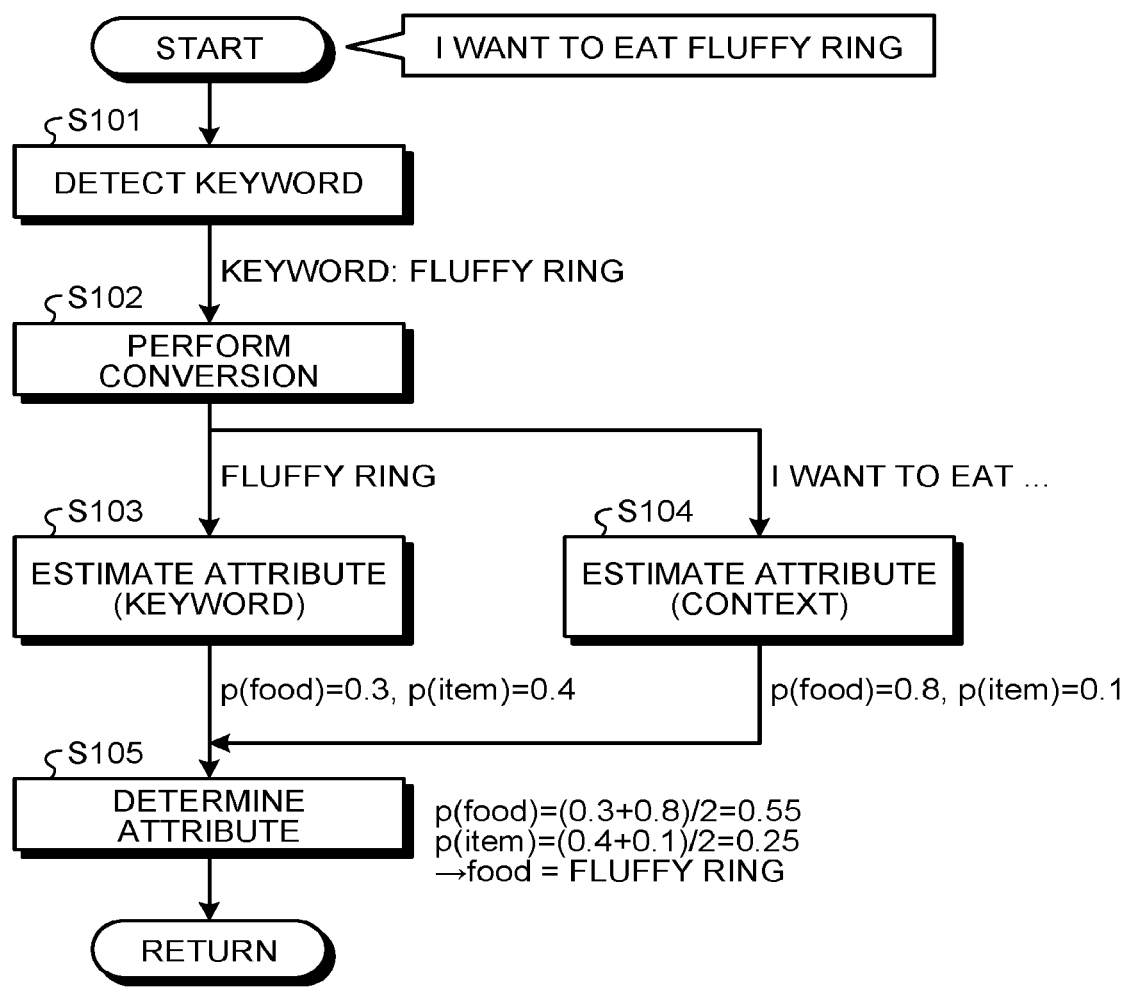

FIG.11

| FOOD | ITEM | AREA | NAME |
|---|---|---|---|
| COFFEE | | SHINJUKU | ABC COFFEE |
| JAPANESE FOOD | | SHINAGAWA | BISTRO ABC |
| WESTERN FOOD | | SHIMBASHI | ABC RESTAURANT |
| SWEETS | | TOKYO | CAFE ABC |
| | CLOTHES | SHIBUYA | ABC CLOTHES |
| | BAG | EBISU | BAG STORE ABC |
| | FINGER RING | MEGURO | JEWELRY SHOP ABC |

INTERACTIVE CONTROL SYSTEM, INTERACTIVE CONTROL METHOD, AND COMPUTER PROGRAM PRODUCT

CROSS-REFERENCE TO RELATED APPLICATIONS

This application is based upon and claims the benefit of priority from Japanese Patent Application No. 2019-046452, filed on Mar. 13, 2019; the entire contents of which are incorporated herein by reference.

FIELD

Embodiments described herein relate generally to an interactive control system, an interactive control method, and a computer program product.

BACKGROUND

Regarding an interactive control system for which, for example, a user enters a natural sentence, and necessary information is extracted from the natural sentence and a response is returned using a natural sentence, there are cases where an unknown keyword (or key phrase) not included in knowledge of the system is entered. To correctly analyze the unknown keyword, the unknown keyword needs to be added to the knowledge. As keywords used by users, new keywords appear on a daily basis, such as product names and vogue words. Every time a new keyword appears, the keyword needs to be added to the knowledge. Additionally, techniques are conventionally known that estimate an attribute of the keyword from input information, such as the natural sentence, and utilize the attribute for interactive controlling.

However, the conventional techniques have difficulty in improving the estimation accuracy of the attribute of a keyword included in the input information.

BRIEF DESCRIPTION OF THE DRAWINGS

FIG. 2B is a flowchart illustrating Example 2 of the attribute determination method in the first embodiment;

FIG. 11 is a diagram illustrating an example of content in the fourth embodiment;

DETAILED DESCRIPTION

An interactive control system according to an embodiment includes one or more hardware processors configured to function as a detection unit, a conversion unit, a first estimation unit, a second estimation unit, and an attribute determination unit. The detection unit detects an input keyword from input information. The conversion unit converts the input information into information including the input keyword and context information including a portion of the input information other than the input keyword. The first estimation unit estimates, from the context information, at least one piece of first estimate information in which a first attribute of the input keyword is associated with a first likelihood representing a likelihood of the first attribute. The second estimation unit estimates, from the input keyword, at least one piece of second estimate information in which a second attribute of the input keyword is associated with a second likelihood representing a likelihood of the second attribute. The attribute determination unit determines an attribute of the input keyword based on the first estimate information and the second estimate information. The following describes embodiments of an interactive control system, an interactive control method, and a computer program product in detail with reference to the accompanying drawings.

First Embodiment

Example of Functional Configuration

Figure 1:
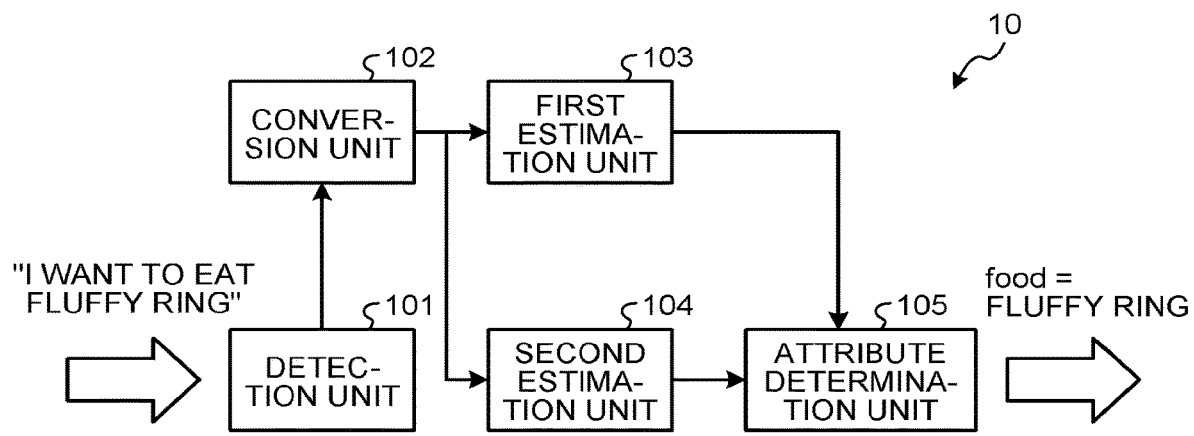
FIG. 1 is a diagram illustrating an example of a functional configuration of an interactive control system according to a first embodiment.

FIG. 1 is a diagram illustrating an example of a functional configuration of an interactive control system 10 according to a first embodiment. The interactive control system 10 according to the first embodiment includes a detection unit 101, a conversion unit 102, a first estimation unit 103, a second estimation unit 104, and an attribute determination unit 105. This interactive control system 10 detects a keyword (or a key phrase) input from input information (for example, an uttered sentence), and estimates an attribute of the input keyword. The attribute and the input keyword are used for interactive controlling. Specifically, the attribute and the input keyword are used in, for example, a search task and an application for responding to questions.

The detection unit 101 detects the input keyword from the input information. When the input information is in a language, such as Japanese, in which words are not divided, the detection unit 101 performs morphological analysis to divide the uttered sentence into words.

Several methods are thinkable for detecting the keyword. Examples will be described below.

A first method for detecting the keyword is, for example, a method with which a list of keywords to be detected is prepared, and a keyword in the list, if included in the uttered sentence, is detected as the keyword.

A second method for detecting the keyword is, for example, a method with which a list of templates of contexts where keywords to be detected are used, such as a context, "restaurant around here serving . . . ", is prepared, and the part " . . . " of the template is detected as a keyword if the template is included in an uttered sentence.

A third method for detecting the keyword is, for example, a method with which a machine learning model is created using learning data that includes a plurality of uttered sentences including keywords to be detected and includes labels indicating locations of the keywords to be detected, and a keyword is detected using the machine learning model.

The conversion unit 102 converts the input information into information including the input keyword and context information including a portion of the input information other than the input keyword.

For example, if an uttered sentence "I want to go to a sushi restaurant" is the input information, a minimum unit of the input keyword is "sushi". The information including the input keyword is, for example, "sushi restaurant" and "I want to go to a sushi restaurant".

The context information is, for example, information other than the input keyword in the information included in the input information. An example of the longest context information is a sentence including all except the input keyword. For example, if the input keyword in the uttered sentence "I want to go to a sushi restaurant" is "sushi", the context information is "I want to go to a . . . restaurant" obtained by masking the input keyword potion. The context information may be "I want to go to . . . ", or "I want to go . . . " obtained by masking information associated with the input keyword.

The context information may include a part or the whole of the input keyword. For example, if the input information is "I want to go to a food store (i.e., a grocery store)", and the input keyword is "food store", the context information may include a part of the input keyword, for example, "I want to go to a . . . store". The context information may also include, for example, the whole input keyword, for example, "I want to go to a food store".

The conversion unit 102 inputs the context information to the first estimation unit 103, and inputs the input keyword to the second estimation unit 104.

From the context information, the first estimation unit 103 estimates at least one piece of first estimate information in which a first attribute of the input keyword is associated with a first likelihood representing a likelihood of the first attribute. To distinguish an attribute estimated from the context information from an attribute estimated from the keyword, the attribute estimated from the context information is called the first attribute. The same applies to the terms "first likelihood" and "first estimate information". The first likelihood ranges, for example, from 0 to 1.

From the input keyword, the second estimation unit 104 estimates at least one piece of second estimate information in which a second attribute of the input keyword is associated with a second likelihood representing a likelihood of the second attribute. To distinguish the attribute estimated from the keyword from the attribute estimated from the context information, the attribute estimated from the keyword is called the second attribute. The same applies to the terms "second likelihood" and "second estimate information". The second likelihood ranges, for example, from 0 to 1.

Based on the first estimate information and the second estimate information, the attribute determination unit 105 determines the attribute of the input keyword.

Example 1 of Attribute Determination Method

Figure 2A:
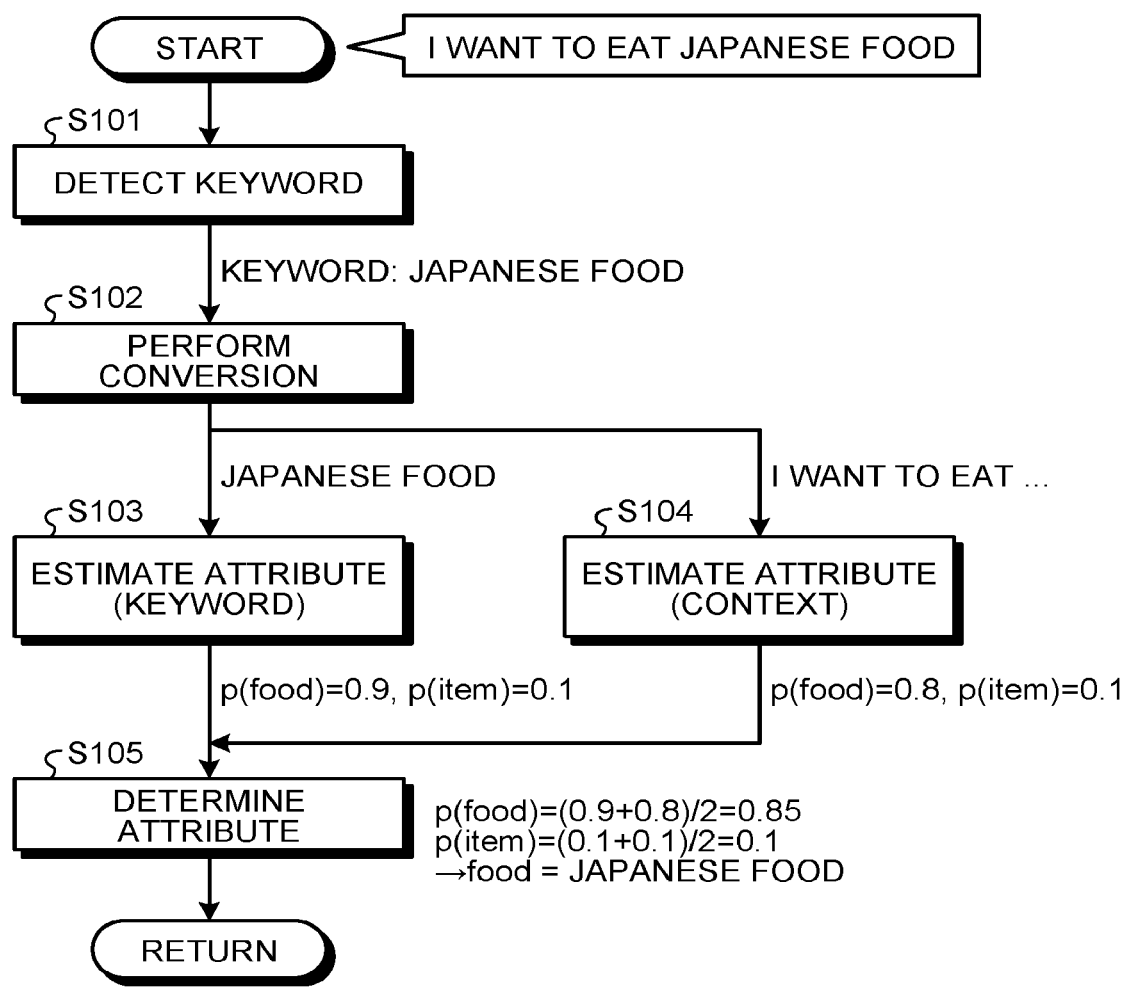
FIG. 2A is a flowchart illustrating Example 1 of an attribute determination method in the first embodiment.

FIG. 2A is a flowchart illustrating Example 1 of an attribute determination method in the first embodiment. With reference to FIG. 2A, the following describes a case where the input information is an uttered sentence "I want to eat Japanese food". "Japanese food" is assumed to be a keyword known to the interactive control system 10.

First, the detection unit 101 detects a keyword "Japanese food" from the input information "I want to eat Japanese food" (Step S101). Then, the conversion unit 102 converts the input information "I want to eat Japanese food" into the keyword "Japanese food" and the context information "I want to eat . . . " (Step S102). The conversion unit 102 inputs the keyword "Japanese food" to the second estimation unit 104, and inputs the context information "I want to eat . . . " to the first estimation unit 103.

Then, the second estimation unit 104 estimates the second attribute of the keyword from the keyword "Japanese food" (Step S103). At this time, the second estimation unit 104 estimates the second likelihood together with the second attribute. The keyword "Japanese food" is a keyword known to the interactive control system, and the interactive control system also has knowledge that the attribute of the keyword "Japanese food" is "food". A high second likelihood of p(food)=0.9 is therefore estimated. A low second likelihood of p(item)=0.1 is also estimated from the keyword "Japanese food".

Then, the first estimation unit 103 estimates the first attribute of the keyword "Japanese food" from the context information (Step S104). At this time, the first estimation unit 103 estimates the first likelihood together with the first attribute. At Step S104, the first attribute "food" is estimated from the context information "I want to eat . . . ". Since the context information "I want to eat . . . " is used with the attribute "food", a high first likelihood of p(food)=0.8 is estimated. A low first likelihood of p(item)=0.1 is also estimated from the context information "I want to eat . . . ".

Then, the attribute determination unit 105 uses the second likelihood estimated by the processing at Step S103 and the first likelihood estimated by the processing at Step S104 to determine the attribute of the keyword "Japanese food" (Step S105). In the example of FIG. 2A, the attribute determination unit 105 compares an average value 0.85 of the first likelihood and the second likelihood of the attribute "food" with an average value 0.1 of the first likelihood and the second likelihood of the attribute "item", and determines the attribute "food" having the higher average value to be the attribute of the keyword "Japanese food".

Example 2 of Attribute Determination Method

FIG. 2B is a flowchart illustrating Example 2 of the attribute determination method in the first embodiment. With reference to FIG. 2B, the following describes a case where the input information is an uttered sentence "I want to eat a Fluffy Ring." "Fluffy Ring" is assumed to be a keyword unknown to the interactive control system 10. "Fluffy Ring" is used herein as a product name of a donut, and the correct attribute thereof is "food".

First, the detection unit 101 detects a keyword "Fluffy Ring" from the input information "I want to eat a Fluffy Ring" (Step S101). Then the conversion unit 102 converts the input information "I want to eat a Fluffy Ring" into the keyword "Fluffy Ring" and the context information "I want to eat . . . " (Step S102). The conversion unit 102 inputs the keyword "Fluffy Ring" to the second estimation unit 104, and inputs the context information "I want to eat . . . " to the first estimation unit 103.

Then, the second estimation unit 104 estimates the second attribute of the keyword from the keyword "Fluffy Ring" (Step S103). At this time, the second estimation unit 104 estimates the second likelihood together with the second attribute. The keyword "Fluffy Ring" is a keyword unknown to the interactive control system, and also, the interactive control system does not have knowledge that the attribute of the keyword "Fluffy Ring" is "food". Therefore, low second likelihoods of p(food)=0.3 and p(item)=0.4 are estimated, and no single attribute can be determined from the keyword "Fluffy Ring".

Then, the first estimation unit 103 estimates the first attribute of the keyword "Fluffy Ring" from the context information (Step S104). At this time, the first estimation unit 103 estimates the first likelihood together with the first attribute. At Step S104, the attribute "food" is estimated from the context information "I want to eat . . . ". Since the context information "I want to eat . . . " is used with the attribute "food", a high first likelihood of p(food)=0.8 is estimated. A low first likelihood of p(item)=0.1 is estimated from the context information "I want to eat . . . ".

Then, the attribute determination unit 105 uses the second likelihood estimated by the processing at Step S103 and the first likelihood estimated by the processing at Step S104 to determine the attribute of the keyword "Fluffy Ring" (Step S105). In the example of FIG. 2B, the attribute determination unit 105 compares an average value 0.55 of the first likelihood and the second likelihood of the attribute "food" with an average value 0.25 of the first likelihood and the second likelihood of the attribute "item", and determines the attribute "food" having the higher average value to be the attribute of the keyword "Fluffy Ring". As described above, although accuracy in estimation of the second attribute of the unknown keyword is lower, the first estimation unit 103 uses the context information to estimate the first attribute. As a result, the correct attribute of the keyword can be eventually output.

Several methods are thinkable for estimating the first attribute by the first estimation unit 103. Examples will be described below.

A first method for estimating the first attribute is a method with which a template of a context (for example, "restaurant around here serving . . . "), in which a keyword of an attribute is used, is prepared for each attribute, and if the template is included in the input information (for example, an uttered sentence), the applicable attribute is estimated as the first attribute.

A second method for estimating the first attribute is a method of estimating the first attribute using a first attribute estimation model trained by machine learning using learning data that includes a plurality of sentences including learning keywords to be learned and labels indicating locations and attributes of the learning keywords included in the sentences.

Several methods are thinkable for estimating the second attribute by the second estimation unit 104. Examples will be described below.

A first method for estimating the second attribute is a method of estimating the second attribute using a keyword list.

Figure 3:
FIG. 3 is a diagram illustrating an example of a keyword list in the first embodiment.

FIG. 3 is a diagram illustrating an example of a keyword list 201 in the first embodiment. The keyword list 201 stores one or more sample keywords in an associated manner for each attribute. For example, when the second attribute is "food", the sample keywords, such as "Japanese food", "western food", and "sweets", are associated.

With reference to the keyword list in which the one or more sample keywords are associated for each attribute, the second estimation unit 104 determines whether the input keyword is included as a sample keyword in the keyword list 201. If the input keyword is included as a sample keyword in the keyword list 201, the second estimation unit 104 estimates the second attribute of the input keyword according to an attribute associated with the sample keyword.

A second method for estimating the second attribute is a method with which a large number of synonyms of/re-worded keywords of respective attributes are prepared and used as learning data to create a machine learning model for estimating the attributes of the keywords, and the machine learning model is used to estimate the second attribute.

As described above, in the interactive control system 10 according to the first embodiment, the detection unit 101 detects the input keyword from the input information. The conversion unit 102 converts the input information into the information including the input keyword and the context information including the portion of the input information other than the input keyword. From the context information, the first estimation unit 103 estimates at least one piece of the first estimate information in which the first attribute of the input keyword is associated with the first likelihood representing the likelihood of the first attribute. From the input keyword, the second estimation unit 104 estimates at least one piece of the second estimate information in which the second attribute of the input keyword is associated with the second likelihood representing the likelihood of the second attribute. Based on the first estimate information and the second estimate information, the attribute determination unit 105 determines the attribute of the input keyword.

With the above-described configuration, the interactive control system 10 according to the first embodiment can improve the accuracy in estimation of the attribute of the keyword included in the input information. Specifically, the estimation of the first attribute of the input keyword using the context information has an advantage of not deteriorating in performance even if the keyword is unknown. However, since there is context information that is used commonly among a plurality of first attributes, the accuracy in estimation lowers compared to that by the estimation of the second attribute using the information on the keyword. In contrast, the estimation of the second attribute using the information on the keyword is higher in performance for input keywords that are known, but is lower in accuracy in estimation for unknown input keywords. The interactive control system 10 according to the first embodiment includes both the first estimation unit 103 and the second estimation unit 104, and therefore, can improve the accuracy in estimation of the attribute of the keyword included in the input information.

Modification of First Embodiment

The following describes a modification of the first embodiment. In the description of the modification, the same description as that of the first embodiment will not be repeated. The modification will be described with reference to a case where the input keyword (a word or a word group) is dealt with by being converted into a word embedding.

Figure 4:
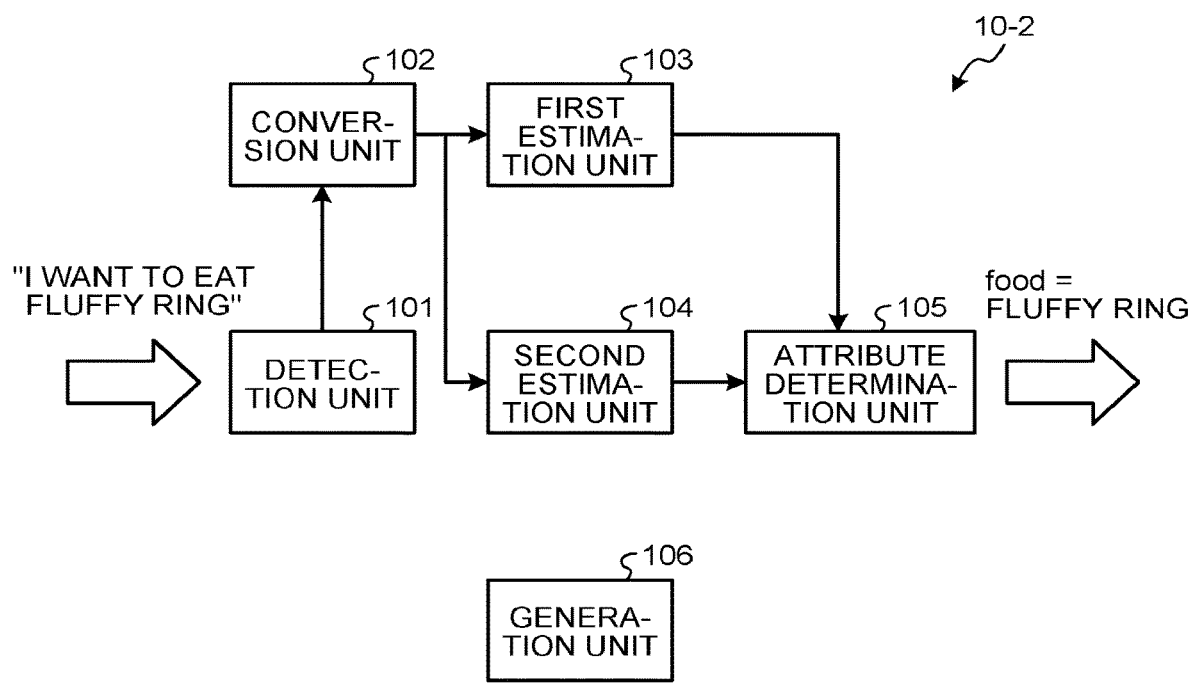
FIG. 4 is a diagram illustrating an example of a functional configuration of an interactive control system according to a modification of the first embodiment.

FIG. 4 is a diagram illustrating an example of a functional configuration of an interactive control system 10-2 according to the modification of the first embodiment. The interactive control system 10-2 according to the modification includes the detection unit 101, the conversion unit 102, the first estimation unit 103, the second estimation unit 104, the attribute determination unit 105, and a generation unit 106. In other words, the generation unit 106 is added in the modification.

The generation unit 106 generates, from the word (keyword), a word embedding in which a feature of the word is represented by a vector. For example, the generation unit 106 generates, from the input keyword, the word embedding in which the feature of the input keyword is represented by the vector. Specifically, the input keyword is converted into vector data of one or higher dimension based on a meaning of the input keyword or how the input keyword is used in a sentence, and thereby, the word embedding of the input keyword is generated. The generation unit 106 uses large-scale data to generate the word embedding in advance so as to reduce a distance between pieces of vector data of words having similar meanings or used in similar ways in a sentence. Examples of a method for calculating the distance include calculation of a Euclidean distance and calculation of a cosine distance.

Using the first attribute estimation model trained by the machine learning using the learning data that includes the sentences including the learning keywords to be learned and the labels indicating the locations and the attributes of the learning keywords included in the sentences, the first estimation unit 103 estimates the first attribute. The modification differs from the first embodiment in that the data format of the learning keywords is converted by the generation unit 106 into the vector data as the word embedding.

The second estimation unit 104 prepares a large number of the synonyms of keywords of respective attributes, then uses the synonyms as the learning data to create the machine learning model for estimating the attributes of the keywords, and uses the machine learning model to estimate the second attribute. The modification differs from the first embodiment in that the data format of the synonyms of keywords is converted by the generation unit 106 into the vector data as the word embedding.

The second estimation unit 104 may calculate a degree of similarity between the input keyword and each of the sample keywords with reference to the keyword list 201 in which the one or more sample keywords are associated for each attribute, and based on the degree of similarity, may estimate at least one piece of the second estimate information including the second attribute and the second likelihood. For example, the second estimation unit 104 may calculate a distance between the word embedding of the input keyword and the word embedding of each of the sample keywords included in the keyword list 201 as the degree of similarity, and estimate the second attribute of the input keyword based on the distance and the attribute of the sample keyword. For example, the second estimation unit 104 may estimate the attribute of each of the one or more sample keywords closer in distance to the input keyword as the second attribute of the input keyword, and estimate the second likelihood of the second attribute according to the distance.

Second Embodiment

The following describes a second embodiment. In the description of the second embodiment, the same description as that of the first embodiment will not be repeated. The second embodiment will be described with reference to a case where the attribute of the input keyword is determined taking into account weights of the estimated first and second attributes.

Example of Functional Configuration

Figure 5:
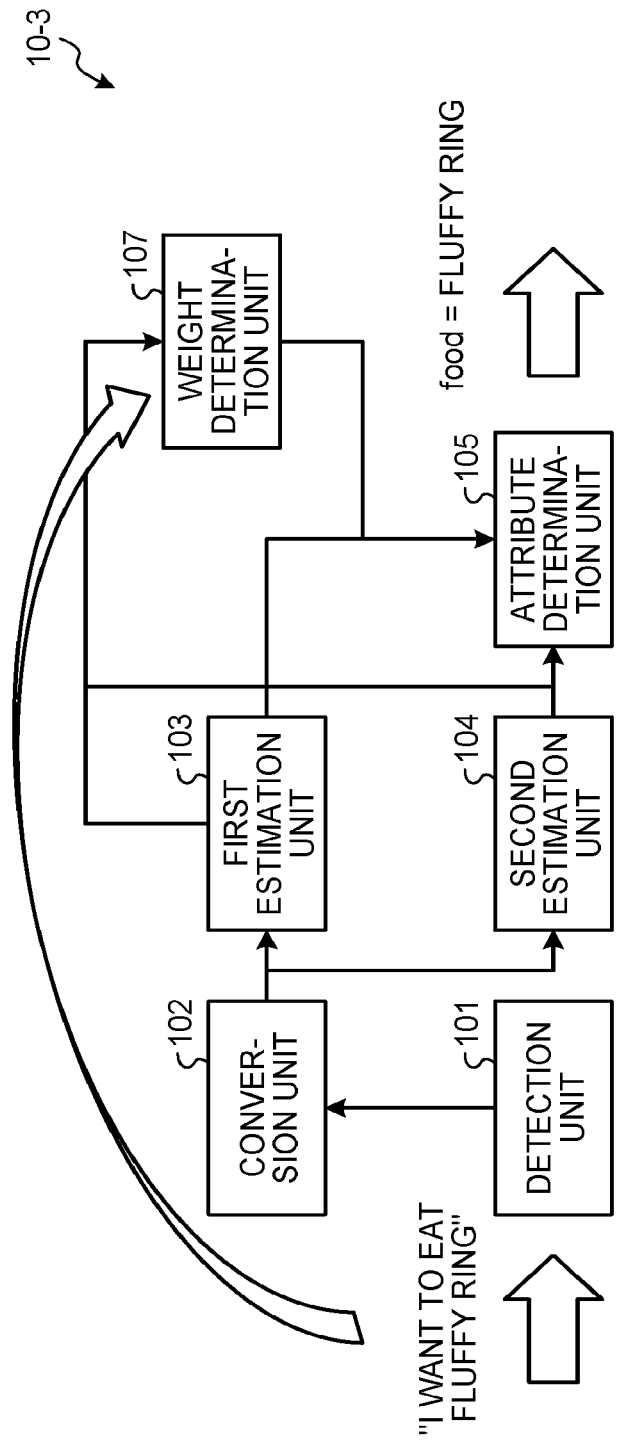
FIG. 5 is a diagram illustrating an example of a functional configuration of an interactive control system according to a second embodiment.

FIG. 5 is a diagram illustrating an example of a functional configuration of an interactive control system 10-3 according to the second embodiment. The interactive control system 10-3 according to the second embodiment includes the detection unit 101, the conversion unit 102, the first estimation unit 103, the second estimation unit 104, the attribute determination unit 105, and a weight determination unit 107. In other words, the weight determination unit 107 is added in the second embodiment.

The weight determination unit 107 determines a first weight and a second weight according to, for example, the first likelihood and the second likelihood.

Example of Attribute Determination Method

Figure 6:
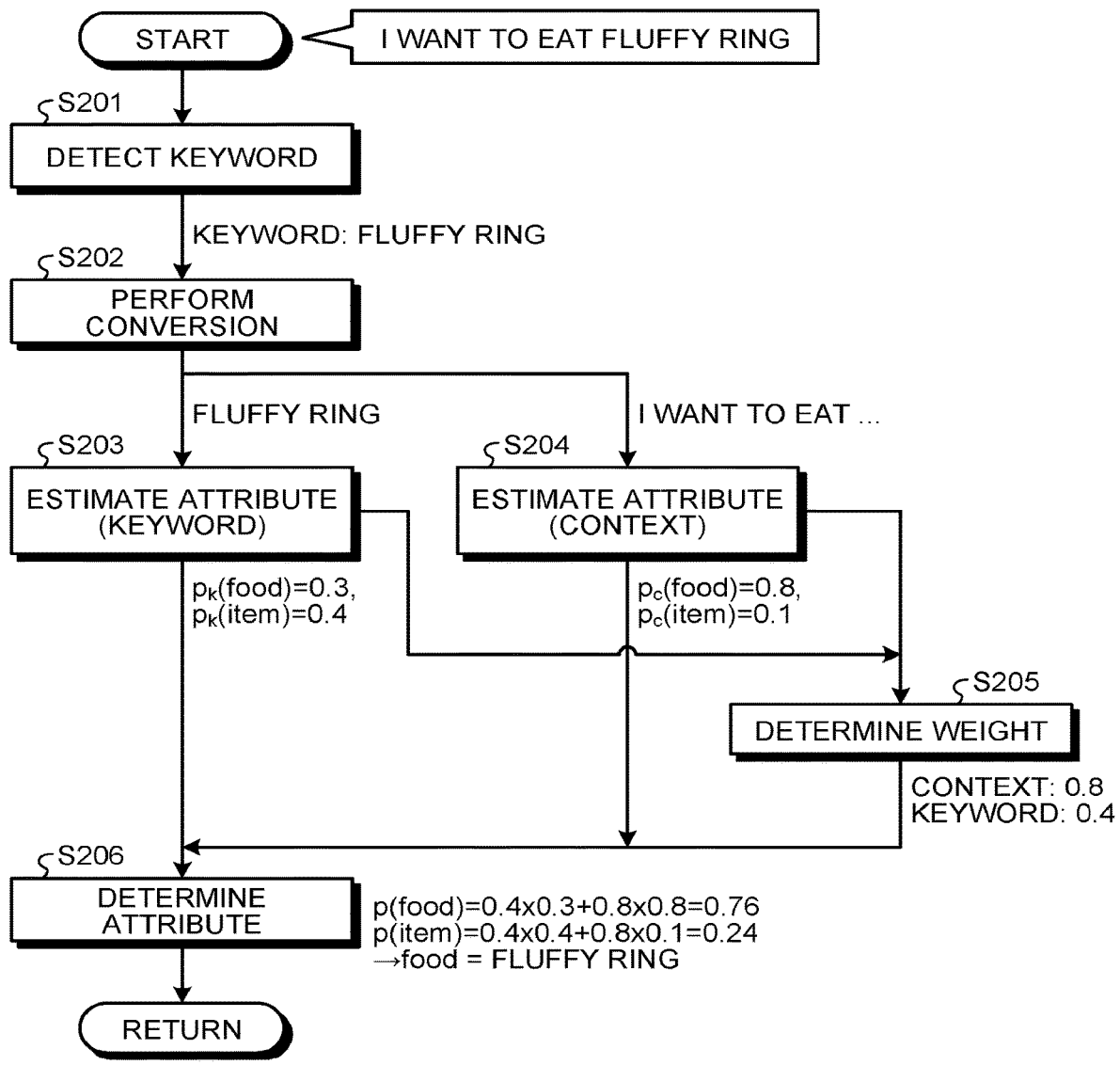
FIG. 6 is a flowchart illustrating an example of an attribute determination method in the second embodiment.

FIG. 6 is a flowchart illustrating an example of an attribute determination method in the second embodiment. Description of Steps S201 to S204 is the same as that of Steps S101 to S104 in FIG. 2A, and therefore, will not be repeated.

According to the first likelihood estimated by the processing (by the first estimation unit 103) at Step S204 and the second likelihood estimated by the processing (by the second estimation unit 104) at Step S203, the weight determination unit 107 determines the first weight and the second weight (Step S205).

Several methods are thinkable for determining the weights. The estimated attribute is more likely to be correct as the likelihood is higher. As such, the example of FIG. 6 uses a method of determining the first weight and the second weight by distributing the weights according to the first likelihood and the second likelihood.

In the example of FIG. 6, processing results of Steps S203 and S204 are as follows:

Processing results of Step S203: $p_k(\text{food})=0.3$, and $p_k(\text{item})=0.4$ Processing results of Step S204: $p_c(\text{food})=0.8$, and $p_c(\text{item})=0.1$ The weight determination unit 107 determines the second weight according to, for example, the maximum value of the second likelihood of the second attribute estimated by the processing at Step S203. Specifically, in the example of FIG. 6, the second weight (for keyword) is 0.4.

The weight determination unit 107 determines the first weight according to, for example, the maximum value of the first likelihood of the first attribute estimated by the processing at Step S204. Specifically, in the example of FIG. 6, the first weight (for context) is 0.8.

Then, the attribute determination unit 105 uses the second likelihood estimated by the processing at Step S203, the first likelihood estimated by the processing at Step S204, and the first weight and the second weight determined by the processing at Step S205 to determine the attribute of the keyword "Fluffy Ring" (Step S206). In the example of FIG.

6, the attribute of the keyword "Fluffy Ring" is determined to be "food" based on a calculation result of (first attribute)*(first weight)+(second attribute)*(second weight).

Specifically, the following calculations are performed:

$p(\text{food})=0.8*p_c(\text{food})+0.4*p_k(\text{food})=0.76$, and $p(\text{item})=0.8*p_c(\text{item})+0.4*p_k(\text{item})=0.24$.

Where, the likelihood of the attribute "food" is higher, so that the attribute of "Fluffy Ring" is determined to be "food". In the example of FIG. 6, the difference between the attribute "food" and the attribute "item" is more outstanding than in the case of FIG. 2B where the weight is not taken into account.

As described above, in the second embodiment, the attribute determination unit 105 further takes into account the weights of the estimated first and second attributes (first and second weights described above) to determine the attribute of the input keyword. With this configuration, the second embodiment can further improve the accuracy in estimation of the attribute of the keyword included in the input information.

Modification of Second Embodiment

The following describes a modification of the second embodiment. In the description of the modification, the same description as that of the second embodiment will not be repeated. The modification will be described with reference to a case where the input keyword (word) is dealt with by being converted into the word embedding.

Example of Functional Configuration

Figure 7:
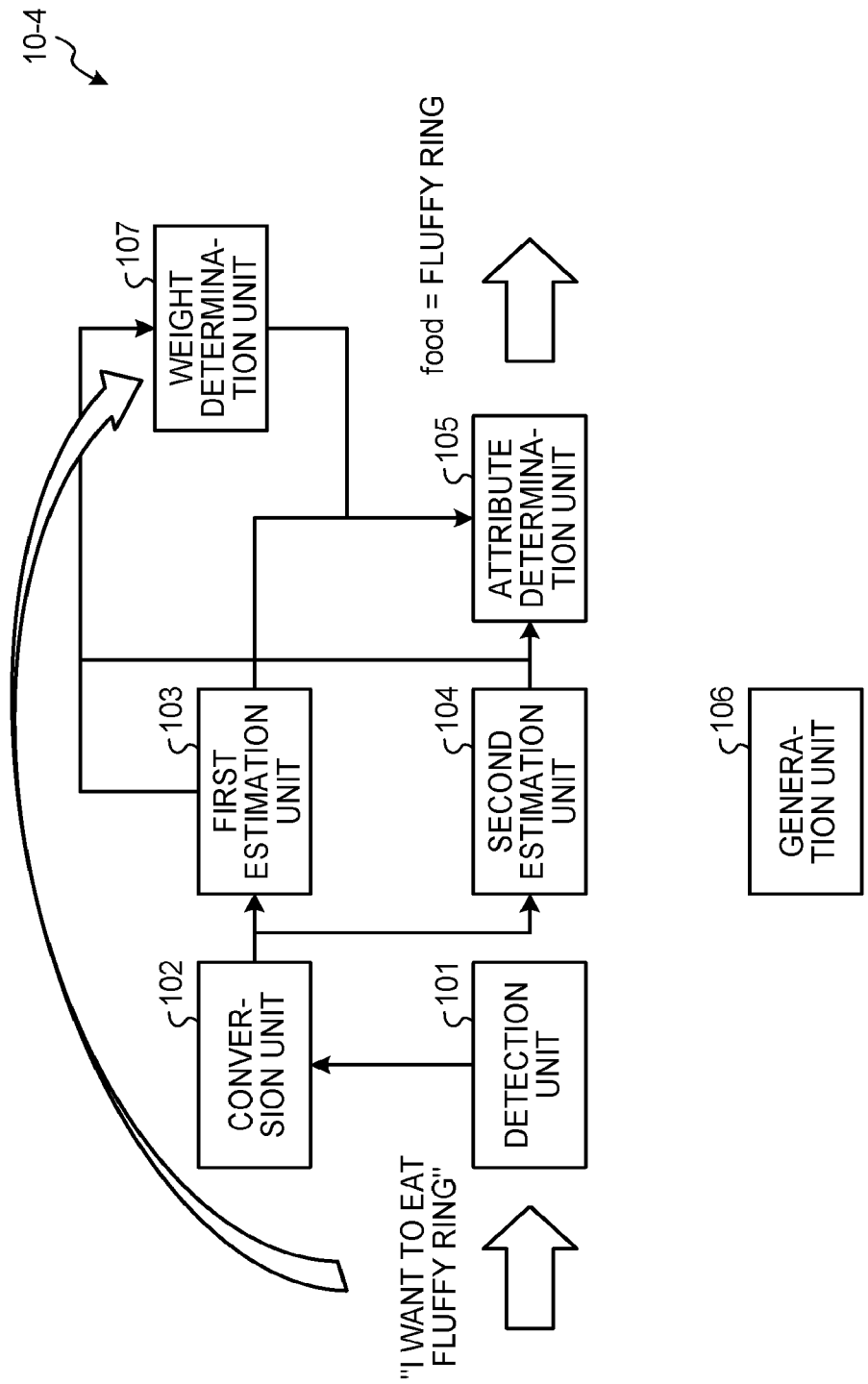
FIG. 7 is a diagram illustrating an example of a functional configuration of an interactive control system according to a modification of the second embodiment.

FIG. 7 is a diagram illustrating an example of a functional configuration of an interactive control system 10-4 according to the modification of the second embodiment. The interactive control system 10-4 according to the modification includes the detection unit 101, the conversion unit 102, the first estimation unit 103, the second estimation unit 104, the attribute determination unit 105, the generation unit 106, and the weight determination unit 107. In other words, the generation unit 106 is added in the modification of the second embodiment.

Description of the generation unit 106 is the same as that in the modification of the first embodiment. The generation unit 106 generates, from the input keyword, the word embedding in which the feature of the input keyword is represented by the vector. The generation unit 106 generates the word embedding of each of the sample keywords included in the keyword list 201.

The second estimation unit 104 calculates the distance between the word embedding of the input keyword and the word embedding of each of the sample keywords included in the keyword list 201 as the degree of similarity, and estimates the second attribute of the input keyword based on the distance and the attribute of the sample keyword.

The weight determination unit 107 determines the first weight and the second weight based on the distance (degree of similarity) between the word embedding of the input keyword and the word embedding of each of the sample keywords included in the keyword list 201. The accuracy in estimation of the second attribute increases as the input keyword is more similar to the sample keyword in the keyword list 201. Accordingly, in the modification, the sample keyword in the keyword list 201 is used to estimate the level of the accuracy in estimation.

Specific examples will be given below.

The generation unit 106 calculates the distance between the input keyword and the sample keyword in the keyword list 201. In this case, the distance is normalized to 0 to 1. The weight determination unit 107 sets to the first weight, the distance of a sample keyword having the smallest distance to the input keyword, and determines the second weight to be a value obtained by subtracting the first weight from 1.

Specific Example 1

"I would like Japanese cuisine" (distance (Japanese cuisine, Japanese food)=0.1)
First attribute (context): $p_c(\text{food})=0.4$, $p_c(\text{item})=0.4$
→First weight: 0.1
Second attribute (keyword): $p_k(\text{food})=0.9$, $p_k(\text{item})=0.1$
→Second weight: 0.9

$p(\text{food})=0.1*p_c(\text{food})+0.9*p_k(\text{food})=0.85$ $p(\text{item})=0.1*p_c(\text{item})+0.9*p_k(\text{item})=0.13$ Where, the likelihood of "food" is higher. Therefore, "food" is output as the attribute of "Japanese cuisine".

Specific Example 2

"I want to eat a Fluffy Ring" (distance (Fluffy Ring, finger ring)=0.6)
First attribute (context): $p_c(\text{food})=0.8$, $p_c(\text{item})=0.1$
→First weight: 0.6
Second attribute (keyword): $p_k(\text{food})=0.3$, $p_k(\text{item})=0.4$
→Second weight: 0.4

$p(\text{food})=0.6*p_c(\text{food})+0.4*p_k(\text{food})=0.66$ $p(\text{item})=0.6*p_c(\text{item})+0.4*p_k(\text{item})=0.22$ Where, the likelihood of "food" is higher. Therefore, "food" is output as the attribute of "Fluffy Ring".

The method for the weight determination unit 107 to determine the first and second weights is not limited to the above-described examples. For example, the weight determination unit 107 may use the machine learning to determine the first and second weights. The weight determination unit 107 may determine the first weight (weight for the first attribute estimated from the context) and the second weight (weight for the second attribute estimated from the input keyword) using a weight determination model trained by the machine learning using learning data that includes a plurality of sentences including learning keywords to be learned and labels indicating locations and attributes of the learning keywords included in the sentences, for example.

Third Embodiment

The following describes a third embodiment. In the description of the third embodiment, the same description as that of the second embodiment will not be repeated. The third embodiment will be described with reference to a case where the attribute of the input keyword is determined taking into account the weights of the estimated first and second attributes. In the third embodiment, the interactive control will be described for a case where the attribute cannot be uniquely determined.

Example of Functional Configuration

Figure 8:
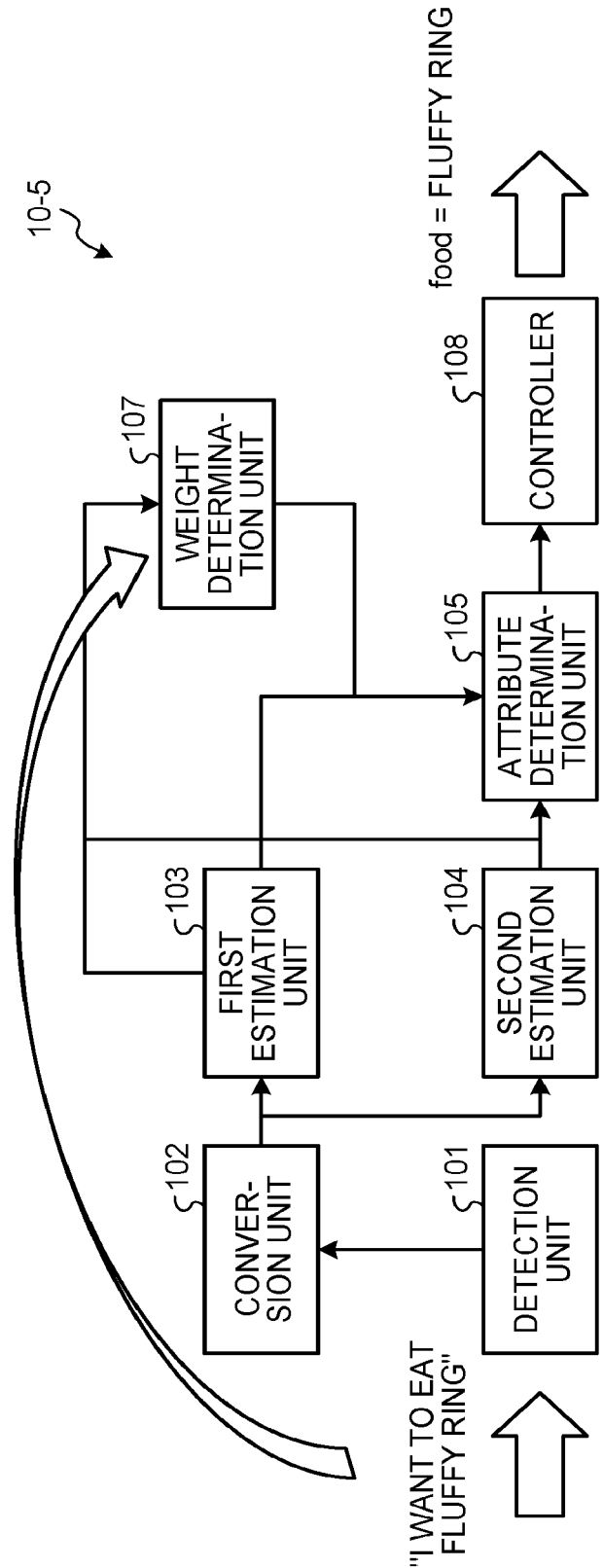
FIG. 8 is a diagram illustrating an example of a functional configuration of an interactive control system according to a third embodiment.

FIG. 8 is a diagram illustrating an example of a functional configuration of an interactive control system 10-5 according to the third embodiment. The interactive control system 10-5 according to the third embodiment includes the detection unit 101, the conversion unit 102, the first estimation unit 103, the second estimation unit 104, the attribute determination unit 105, the weight determination unit 107, and a controller 108. In other words, the controller 108 is added in the third embodiment.

When a single attribute of the input keyword is not determinable, the controller 108 outputs information to inquire about the attribute of the input keyword. This can lower the possibility of outputting an erroneous attribute compared to the case of forcibly narrowing down to one attribute.

Example of Interactive Control Method

Figure 9:
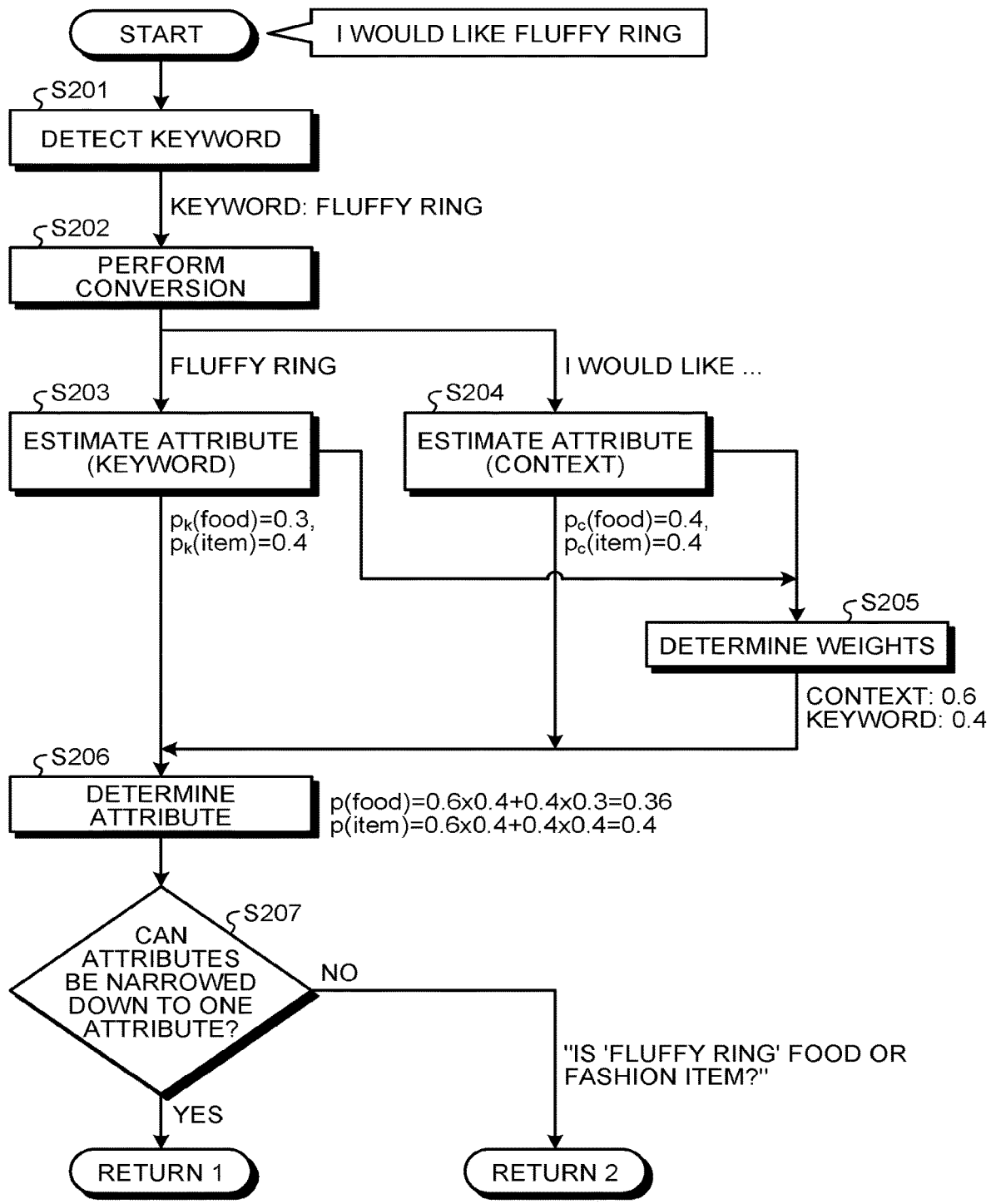
FIG. 9 is a flowchart illustrating an example of an interactive control method in the third embodiment.

FIG. 9 is a flowchart illustrating an example of the interactive control method in the third embodiment. In the example of FIG. 9, after the attribute determination unit 105 determines the attribute (Step S206), the attribute determination unit 105 determines whether the attributes of the input keyword can be narrowed down to one attribute (Step S207).

If not (No at Step S207), the controller 108 outputs the information to inquire about the attribute of the input keyword. For example, in the example of FIG. 9, the controller 108 inquires "Is 'Fluffy Ring' a food or a fashion item?" This inquiry enables a correct attribute to be obtained from a response by the user.

The following describes an example of a method for the determination at Step S207. In this example, likelihoods output from the attribute determination unit 105 are used. For example, a threshold is provided for each difference of the likelihoods between the respective attributes. For example, if the difference in likelihood between the attributes is smaller than the threshold, the controller 108 outputs the information to inquire about the attribute of the input keyword using the two attributes, the difference between which is obtained.

For example, the attribute determination unit 105 sorts the attributes in descending order of the likelihood of the attribute, and calculates a difference in likelihood between the highest rank and each rank to determine whether the difference is smaller than the threshold. If the difference in likelihood is smaller than the threshold, the controller 108 outputs the information to inquire about the attribute of the input keyword using the attributes, the difference between which is obtained. For example, if the difference between the highest rank and the second highest rank and the difference between the highest rank and the third highest rank are smaller than the threshold, the controller 108 outputs the information to inquire about the attribute of the input keyword using the attributes of the highest to third highest ranks.

For example, the controller 108 outputs the information to inquire about the attribute of the input keyword using the attributes having likelihoods higher than the threshold.

The following describes specific examples in the case where the attribute determination unit 105 cannot narrow down the attributes to one attribute.

Specific Example 1

"I would like a Fluffy Ring"
First attribute (context): $p_c(\text{food})=0.4$, $p_c(\text{item})=0.4$, $p_c(\text{name})=0.2$
→First weight: 0.6(=1−(second weight))
Second attribute (keyword): $p_k(\text{food})=0.3$, $p_k(\text{item})=0.4$, $p_c(\text{name})=0.2$
→Second weight: 0.4

$p(\text{food})=0.6*p_c(\text{food})+0.4*p_k(\text{food})=0.36$ $p(\text{item})=0.6*p_c(\text{item})+0.4*p_k(\text{item})=0.4$ $p(\text{name})=0.6*p_c(\text{name})+0.4*p_k(\text{name})=0.2$ The likelihood values of "food" and "item" are close to each other. For example, if the threshold for the difference in likelihood is set to 0.1, the following relations hold.

$p(\text{food})-p(\text{item})=0.04<0.1$ $p(\text{food})-p(\text{name})=0.16>0.1$ In this case, the attribute determination unit 105 does not narrow down the attributes to one attribute, and instead, outputs "food" and "item" as the attributes of the input keyword.

For example, if the threshold for the likelihood is set to 0.3, the following relations hold.

$p(\text{food})=0.36>0.3$ $p(\text{item})=0.4>0.3$ $p(\text{name})=0.2<0.3$

Also in this case, the attribute determination unit 105 does not narrow down the attributes to one attribute, and instead, outputs "food" and "item" as the attributes of the input keyword.

As described above, in the third embodiment, if the attribute of the input keyword cannot be determined to one, the controller 108 outputs the information to inquire about the attribute of the input keyword. This can lower the possibility of outputting an erroneous attribute compared to the case of forcibly narrowing down the attributes to one attribute.

Fourth Embodiment

The following describes a fourth embodiment. In the description of the fourth embodiment, the same description as that of the second embodiment will not be repeated. The fourth embodiment will be described with reference to a case where the sample keywords associated with the attribute are used for searching.

Example of Functional Configuration

Figure 10:
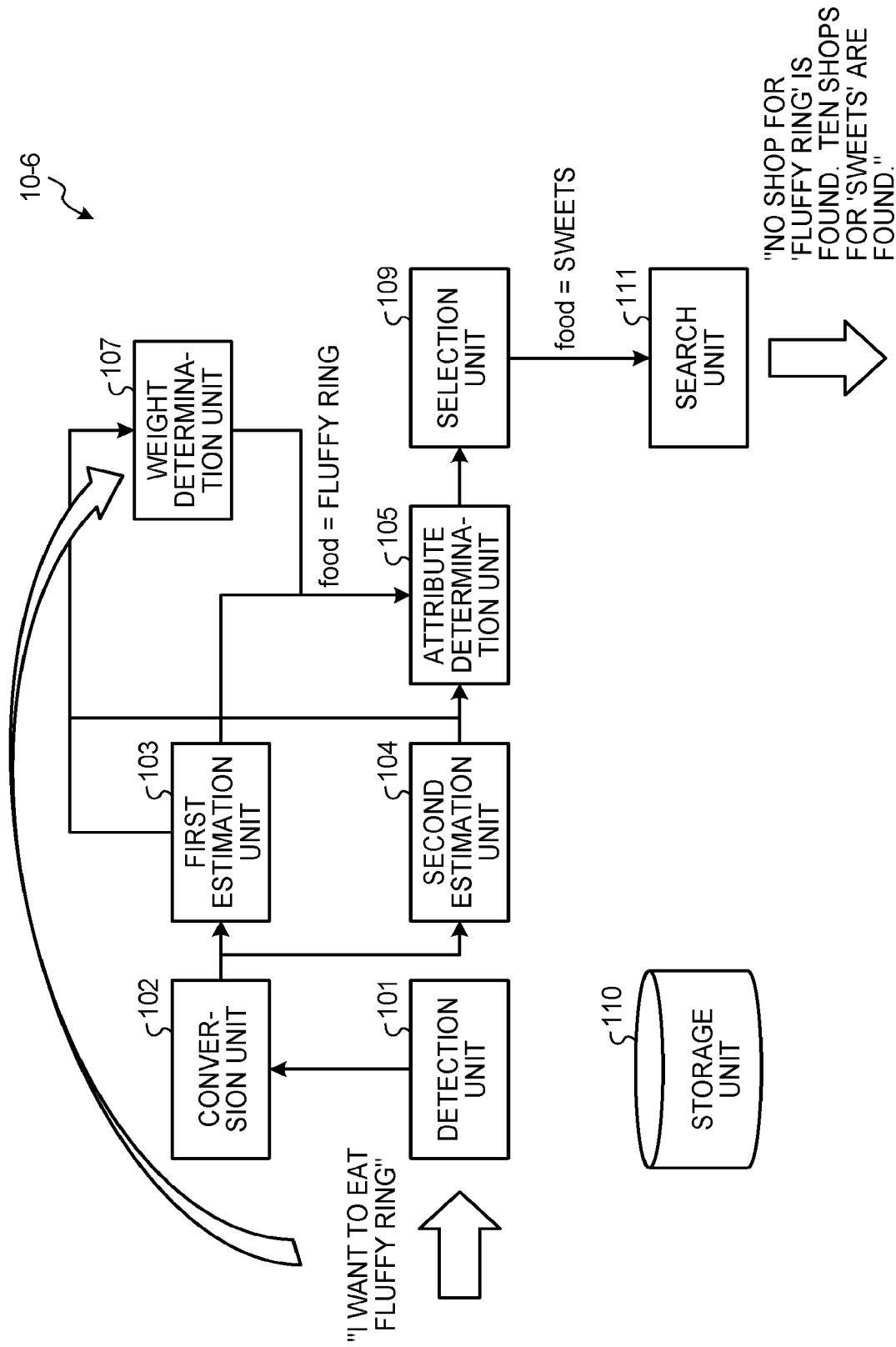
FIG. 10 is a diagram illustrating an example of a functional configuration of an interactive control system according to a fourth embodiment.

FIG. 10 is a diagram illustrating an example of a functional configuration of an interactive control system 10-6 according to the fourth embodiment. The interactive control system 10-6 according to the fourth embodiment includes the detection unit 101, the conversion unit 102, the first estimation unit 103, the second estimation unit 104, the attribute determination unit 105, the weight determination unit 107, a selection unit 109, a storage unit 110, and a search unit 111. In other words, the selection unit 109, the storage unit 110, and the search unit 111 are added in the fourth embodiment.

The selection unit 109 selects a search keyword from one or more sample keywords associated with the same attribute as the attribute of the input keyword (refer to the keyword list 201 in FIG. 3) based on the degree of similarity between the input keyword and each of the one or more sample keywords. For example, the selection unit 109 calculates, as the degree of similarity, the distance between the input keyword and one of the sample keywords of the attribute determined by the attribute determination unit 105. In this case, the selection unit 109 selects, as the search keyword, for example, a sample keyword having the minimum distance to the input keyword from among the sample keywords determined by the attribute determination unit 105. Since the sample keyword closest to the input keyword "Japanese cuisine" is "Japanese food", the selection unit 109 selects "Japanese food".

For example, since the attribute of "Fluffy Ring" is "food", the selection unit 109 selects "sweets" having the smallest distance to "Fluffy Ring" from among the sample keywords in "food". Of all the sample keywords, the closest sample keyword to "Fluffy Ring" is "finger ring". If the selection unit 109 compares "Fluffy Ring" with the sample keywords of all the attributes without narrowing down the attributes, the selection unit 109 selects "finger ring" because "finger ring" is closest to "Fluffy Ring". Here, by making the comparison with the sample keywords associated with the attribute determined by the attribute determination unit 105, the selection unit 109 can select "sweets". As a result, the search unit 111 can search for content of "sweets".

The storage unit 110 stores therein information. The storage unit 110 stores therein, for example, the above-described keyword list 201 and search target contents.

FIG. 11 is a diagram illustrating an example of the contents according to the fourth embodiment. In the example of FIG. 11, the contents are stored in a database having the attributes ("food", "item", "area", and "name") as columns. Data pieces in each of the attributes correspond to, for example, the sample keywords in the keyword list 201.

The search unit 111 uses the keyword selected by the selection unit 109 to search for the content.

Example 1 of Search Method

Figure 12:
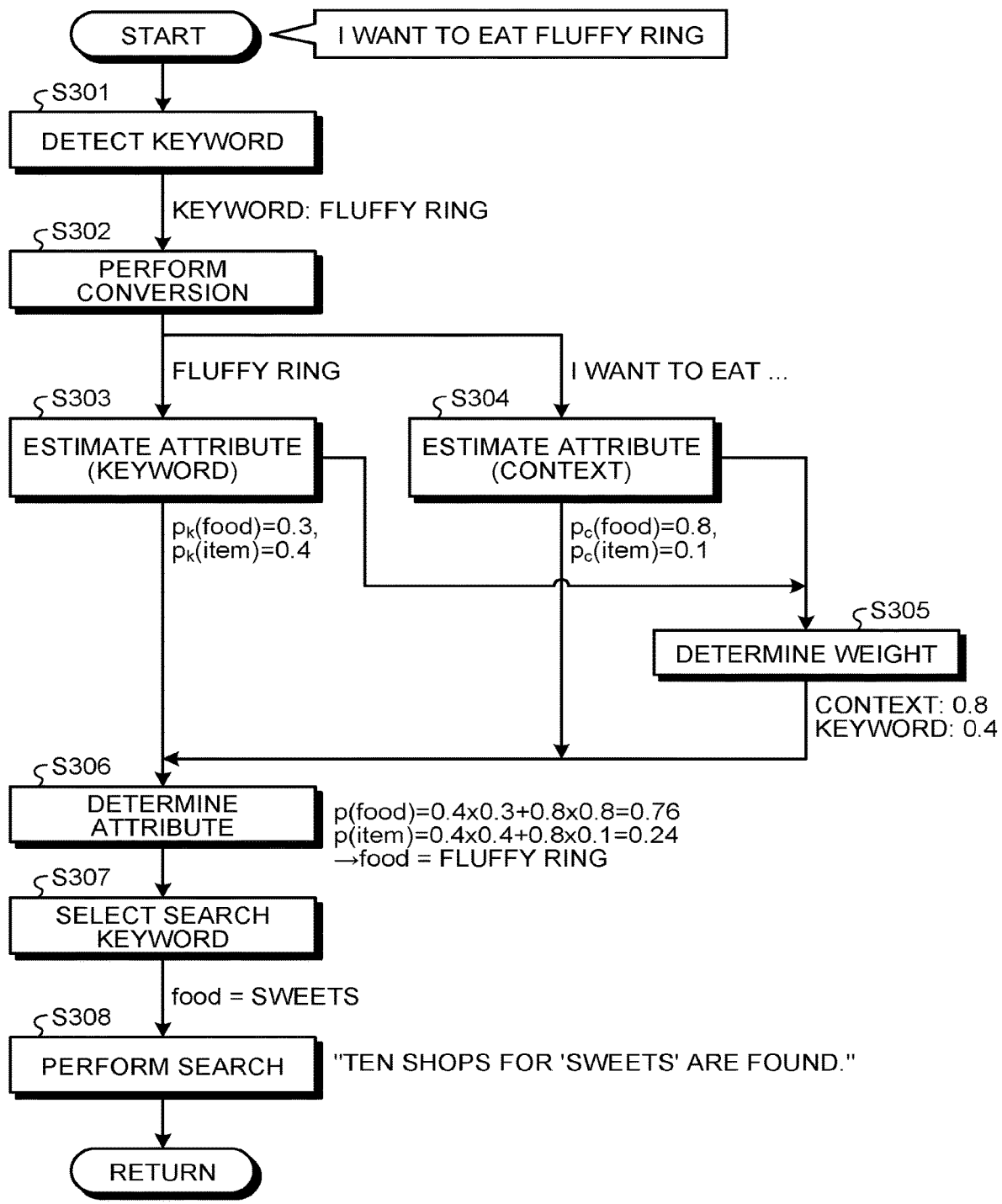
FIG. 12 is a flowchart illustrating Example 1 of a search method in the fourth embodiment.

FIG. 12 is a flowchart illustrating Example 1 of a search method in the fourth embodiment. Description of Steps S301 to S306 is the same as that of Steps S201 to S206 in FIG. 6, and therefore, will not be repeated. Since the attribute of "Fluffy Ring" is "food", the selection unit 109 selects the search keyword based on the degree of similarity between "Fluffy Ring" and each of the one or more sample keywords associated with "food". For example, the selection unit 109 selects, as a search keyword, "sweets" having the smallest distance to "Fluffy Ring" from among the sample keywords in "food" (Step S307).

Then, the search unit 111 uses the keyword selected by the processing at Step S307 to search for the content. In the example of FIG. 12, the search unit 111 makes a notification, "Ten shops of 'sweets' are fund.", and outputs the search results of the content.

Example 2 of Search Method

Figure 13:
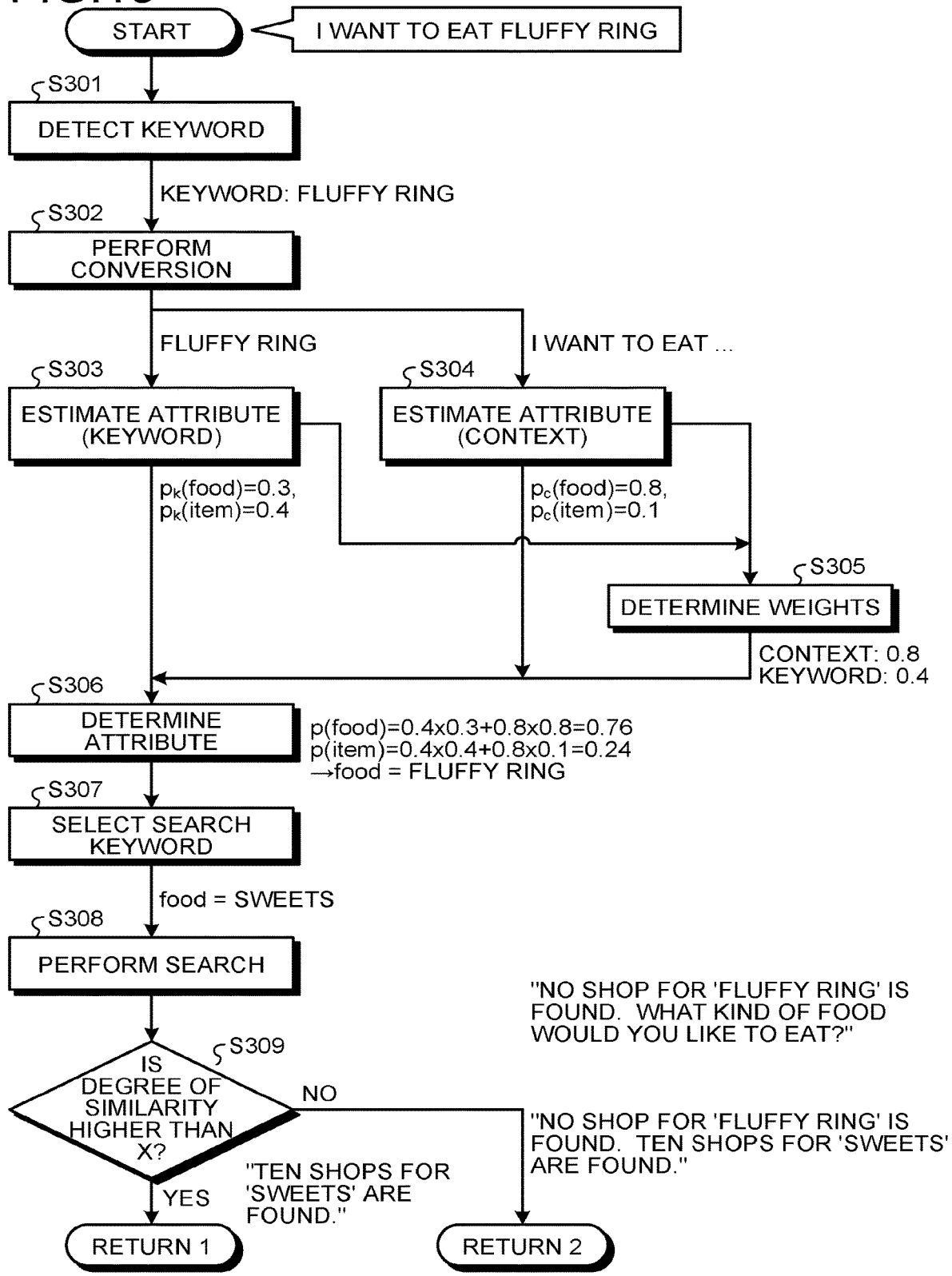
FIG. 13 is a flowchart illustrating Example 2 of the search method in the fourth embodiment.

FIG. 13 is a flowchart illustrating Example 2 of the search method in the fourth embodiment. Description of Steps S301 to S308 is the same as that in FIG. 12, and therefore, will not be repeated. The search unit 111 determines whether the degree of similarity between the input keyword "Fluffy Ring" and the sample keyword "sweets" associated with "food" is higher than a threshold X (Step S309). The threshold X may be set as appropriate according to, for example, a criterion for the degree of similarity.

If the degree of similarity is higher than the threshold X (Yes at Step S309), the search unit 111 makes the notification, "Ten shops for 'sweets' are found.", and outputs the search results of the content.

If the degree of similarity is lower than the threshold X (No at Step S309), in other words, if the search keyword is determined not to be similar to the input keyword, the content of the user' preference is unlikely to be presented by making a search using the search keyword with the search unit 111. Accordingly, the search unit 111 presents alternatives by making a notification, "No shop for 'Fluffy Ring' is found. Ten shops for 'sweets' are found.". Alternatively, the search unit 111 prompts the user to enter another keyword by notifying information, for example, "No shop for 'Fluffy Ring' is found. What kind of food would you like to eat?" In this case, since the attribute "food" is known, the search unit 111 can allow the user to recognize what to say, in a clearly understandable way, by making a notification, "What kind of food would you like to eat?" to request a keyword for a food. For example, the user rewords "Fluffy Ring" to another food to say, for example, "I want to eat a donut.". As a result, the search unit 111 can acquire the input keyword "donut" that can be used for searching.

As described in the above third embodiment, cases may be present where the attribute determination unit 105 cannot narrow down the attributes to one attribute. In such cases, the search unit 111 can inquire back to the user to narrow down the attributes to one attribute, or can also use the attributes for searching as they are, without narrowing down. In this case, the selection unit 109 calculates the distances to the one or more sample keywords for the respective attributes output from the attribute determination unit 105. For example, if the attributes "food" and "item" are output from the attribute determination unit 105, the selection unit 109 calculates the distances between the input keyword and the one or more sample keywords associated with the respective attributes. The selection unit 109 selects, for example, a sample keyword having the smallest distance in each of the attributes, and outputs the sample keyword as the search keyword. The search unit 111 uses the search keyword for each of the attributes to search for the content, and notifies the user of information, for example, "No shop for 'Fluffy Ring' is found. Ten shops for 'finger ring' are found. Ten shops for 'sweets' are found.".

If the degree of similarity between the input keyword and each of the one or more sample keywords associated with the same attribute as the attribute of the input keyword is lower than the threshold X, the selection unit 109 may notify the user of information indicating that the input keyword is not acceptable.

As described above, in the fourth embodiment, the search unit 111 uses the sample keyword associated with the same attribute as the attribute determined by the attribute determination unit 105 to search for the content. According to the fourth embodiment, the attribute determined by the attribute determination unit 105 can be used for searching for the content.

Finally, an example of a hardware configuration of the interactive control system 10

Example of Hardware Configuration

Figure 14:
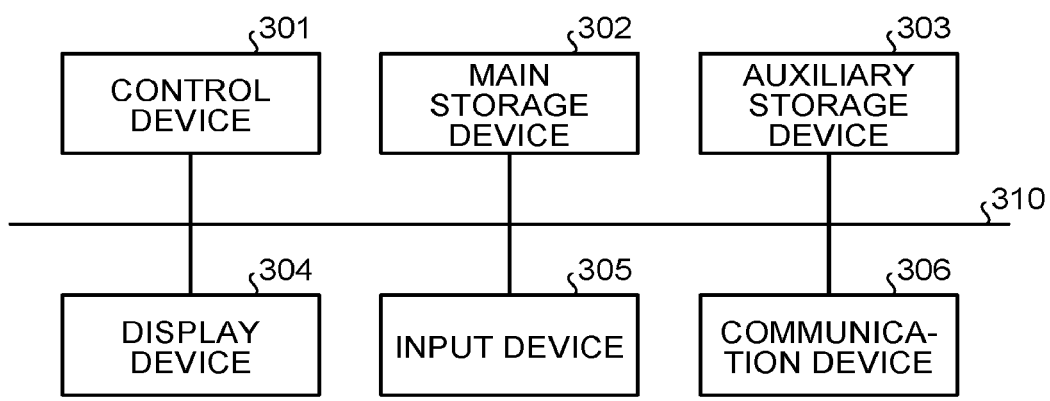
FIG. 14 is a diagram illustrating an example of a hardware configuration in the first to fourth embodiments.

FIG. 14 is a diagram illustrating the example of the hardware configuration in the first to fourth embodiments.

The interactive control system 10 includes a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are connected together through a bus 310.

The control device 301 executes a computer program read from the auxiliary storage device 303 into the main storage device 302. The main storage device 302 is a memory including, for example, a read-only memory (ROM) or a random-access memory (RAM). The auxiliary storage device 303 is, for example, a hard disk drive (HDD), a solid-state drive (SSD), or a memory card.

The display device 304 displays display information. The display device 304 is, for example, a liquid crystal display. The input device 305 is an interface for operating a computer to work as the interactive control system 10. The input device 305 is, for example, a keyboard and a mouse. When the computer is a smart device, such as a smartphone or a tablet computer, the display device 304 and the input device 305 are, for example, a touchscreen panel. The communication device 306 is an interface for communicating with other devices.

The computer program to be executed on the computer is provided as a computer program product by being recorded as a file in an installable format or an executable format on a computer-readable storage medium, such as a compact disc read-only memory (CD-ROM), a memory card, a compact disc-recordable (CD-R), or a digital versatile disc (DVD).

The computer program to be executed on the computer may be provided by being stored on a computer connected to a network, such as the Internet, and downloaded through the network. The computer program to be executed on the computer may also be provided through a network, such as the Internet, without being downloaded.

The computer program to be executed on the computer may also be provided by being incorporated in advance in a ROM or the like.

The computer program to be executed on the computer has a modular configuration including functional blocks implementable also by the computer program among the functional components (functional blocks) of the interactive control system 10 described above. As the actual hardware, the control device 301 reads the computer program from the storage medium and executes the computer program to load the above-described functional blocks in the main storage device 302. In other words, the above-described functional blocks are generated in the main storage device 302.

One, some, or all of the above-described functional blocks may be implemented by hardware, such as an integrated circuit (IC), without being implemented by software.

When a plurality of processors is used to implement the functions, each of the processors may implement one of the functions, or two or more of the functions.

The interactive control system 10 may operate in any mode of operation of the computer. For example, the interactive control system 10 may be implemented by one computer. The interactive control system 10 may operate, for example, as a cloud system on a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An interactive control system comprising:
one or more hardware processors configured to:
detect an input keyword from input information inputted by a user, the input information being an inputted sentence from the user;
convert the input information inputted by the user into information including the input keyword and context information including a portion of the sentence inputted by the user other than the input keyword;
perform a first estimation to estimate, from the context information, at least one piece of first estimate information in which a plurality different attributes are associated with different respective likelihoods of corresponding to the input keyword and a first attribute of the input keyword is associated with a first likelihood representing a likelihood of the first attribute based on the context information;
perform a second estimation to estimate, from the input keyword, at least one piece of second estimate information in which a plurality different attributes are associated with different respective likelihoods of corresponding to the input keyword and a second attribute of the input keyword is associated with a second likelihood representing a likelihood of the second attribute based on the input keyword; and
determine an attribute of the input keyword based on both (i) the first estimate information, a first weight representing a weight for the first likelihood, and (ii) the second estimate information, and a second weight representing a weight for the second likelihood.

2. The interactive control system according to claim 1, wherein the one or more hardware processors are configured to further determine the first weight and the second weight determine the attribute of the input keyword based on the first likelihood and the first weight, and on the second likelihood and the second weight.

3. The interactive control system according to claim 2, wherein the one or more hardware processors determine the first weight and the second weight according to the first likelihood and the second likelihood.

4. The interactive control system according to claim 2, wherein the one or more hardware processors determine the first weight and the second weight using a weight determination model trained by machine learning using learning data that includes a plurality of sentences including learning keywords to be learned and labels indicating locations and attributes of the learning keywords included in the sentences.

5. The interactive control system according to claim 2, wherein the one or more hardware processors refer to a keyword list in which one or more sample keywords are associated for each attribute to determine whether the input keyword is included as one of the sample keywords in the keyword list, and, when the input keyword is included as one of the sample keywords in the keyword list, estimate the second attribute of the input keyword according to an attribute associated with the one of the sample keywords.

6. The interactive control system according to claim 2, wherein the one or more hardware processors refer to a keyword list in which one or more sample keywords are associated for each attribute to calculate a degree of similarity between the input keyword and each of the sample keywords, and estimate at least one piece of the second estimate information based on the degree of similarity.

7. The interactive control system according to claim 6, wherein the one or more hardware processors determine the second weight based on the degree of similarity, and determine the first weight based on the second weight.

8. The interactive control system according to claim 1, wherein
the one or more hardware processors are configured to further output, when attributes of the input keyword are not determinable as a single attribute, information to inquire about the attribute of the input keyword.

9. The interactive control system according to claim 6, wherein
the one or more hardware processors are configured to further select, from among the one or more sample keywords, a search keyword based on the degree of similarity between the input keyword and each of the one or more sample keywords associated with a same attribute as the attribute of the input keyword; and
search for content by using the search keyword.

10. The interactive control system according to claim 9, wherein the one or more hardware processors notify information indicating that the input keyword is not acceptable when the degree of similarity between the input keyword and each of the one or more sample keywords associated with the same attribute as the attribute of the input keyword is lower than a threshold.

11. An interactive control method performed by a computer, the method, comprising:
detecting an input keyword from input information inputted by a user, the input information being an inputted sentence from the user;
converting the input information inputted by the user into information including the input keyword and context information including a portion of the sentence inputted by the user other than the input keyword;
perform a first estimation of estimating, from the context information, at least one piece of first estimate information in which a plurality different attributes are associated with different respective likelihoods of corresponding to the input keyword and a first attribute of the input keyword is associated with a first likelihood representing a likelihood of the first attribute based on the context information;
perform a second estimation of estimating, from the input keyword, at least one piece of second estimate information in which a plurality different attributes are associated with different respective likelihoods of corresponding to the input keyword and a second attribute of the input keyword is associated with a second likelihood representing a likelihood of the second attribute based on the input keyword; and
determining an attribute of the input keyword based on both (i) the first estimate information, a first weight representing a weight for the first likelihood, and (ii) the second estimate information, and a second weight representing a weight for the second likelihood.

12. A computer program product having a non-transitory computer readable medium including programmed instructions thereon, wherein the instructions, when executed by a computer, cause the computer to function as:
a detection unit that detects an input keyword from input information inputted by a user, the input information being an inputted sentence from the user;
a conversion unit that converts the input information inputted by the user into information including the input keyword and context information including a portion of the sentence inputted by the user other than the input keyword;
a first estimation unit that performs a first estimation that estimates, from the context information, at least one piece of first estimate information in which a plurality different attributes are associated with different respective likelihoods of corresponding to the input keyword and a first attribute of the input keyword is associated with a first likelihood representing a likelihood of the first attribute based on the context information;
a second estimation unit that performs a second estimation that estimates, from the input keyword, at least one piece of second estimate information in which a plurality different attributes are associated with different respective likelihoods of corresponding to the input keyword and a second attribute of the input keyword is associated with a second likelihood representing a likelihood of the second attribute based on the input keyword; and
an attribute determination unit that determines an attribute of the input keyword based on both (i) the first estimate information, a first weight representing a weight for the first likelihood, and (ii) the second estimate information, and a second weight representing a weight for the second likelihood.

* * * * *